United States Patent [19]

Yamamura et al.

[11] 4,340,233
[45] Jul. 20, 1982

[54] FERROFLUID SEAL APPARATUS

[75] Inventors: Akira Yamamura, Framingham, Mass.; Kuldip Raj, Merrimack, N.H.

[73] Assignee: Ferrofluidics Corporation, Nashua, N.H.

[21] Appl. No.: 208,438

[22] Filed: Nov. 19, 1980

[51] Int. Cl.³ ............... F16J 15/40; F16J 15/54
[52] U.S. Cl. ................................. 277/1; 277/80; 308/10
[58] Field of Search ............ 277/1, 80, 135, DIG. 7; 308/10, 36.1, 187.1, 187.2

[56] References Cited

U.S. PATENT DOCUMENTS 4,304,411 12/1981 Wilcock et al. .............. 277/80

FOREIGN PATENT DOCUMENTS 783881 10/1957 United Kingdom ............ 277/80
631726 11/1978 U.S.S.R. ......................... 277/80
783881 6/1980 U.S.S.R. ......................... 277/80

Primary Examiner—Robert S. Ward, Jr.
Attorney, Agent, or Firm—Richard P. Crowley

[57] ABSTRACT

A ferrofluid rotary-shaft seal apparatus of extended seal life particularly adapted for use as an exclusion seal with a computer-disc-drive spindle, which seal apparatus comprises: an annular permanent magnet; first and second pole pieces of unequal length at the one end, and which one end of each pole piece extends into a close, noncontacting relationship with the surface of the shaft, to form a small-gap width and a large-gap width between the one end of the pole piece and the surface of the shaft; and a ferrofluid in the small- and large-gap widths to form a ferrofluid O-ring seal at each gap width, whereby, during rotation of the shaft, the ferrofluid at the small-gap width evaporates and forms an air gap, while the ferrofluid at the large-gap width provides extended seal life.

17 Claims, 2 Drawing Figures

FERROFLUID SEAL APPARATUS

BACKGROUND OF THE INVENTION

Ferrofluid-type seal apparatuses for use in sealing rotary shafts, with single-and multiple-stage, ferrofluid-liquid, O-ring seals about the shaft, are well known (see, for example, U.S. Pat. No. 3,620,584 which describes a multiple-stage, ferrofluid, rotary-shaft seal).

Single- and multiple-stage ferrofluid seals have been used as exclusion seals, to protect one environment on one side of the shaft from contaminants in an environment on the other side of the shaft. Ferrofluid-type exclusion seals are useful particularly with computer-disc-drive spindles, to prevent contaminants in an environment from reaching a memory-disc area.

One standard ferrofluid exclusion seal presently employed in the computer field comprises an annular, ring-like, permanent magnet adapted to surround the spindle shaft and sandwiched between two, identical, pole-piece elements which are placed at the outer diameter into a contacting, magnetic-flux relationship with the one and the other polar ends of the permanent magnet. The inner diameter of the pole-piece elements extends into a close, noncontacting relationship with the surface of the shaft or spindle, to form a small gap for example, 2 to 10 mils, between the inner diameter of the pole piece elements and the shaft surface. A ferrofluid is disposed and magnetically retained in the gaps on the insertion of the magnetically permeable shaft or spindle, to form one or more liquid O-ring stages, which serve to form a ferrofluid exclusion seal about the shaft.

A wide variety of magnetic materials may be used to provide the permanent magnet, but usually the material is a sintered or bonded ceramic material having a longitudinal thickness of about 80 to 150 mils. The pole-piece elements are composed of magnetically permeable material, such as magnetic stainless steel (for example, 400 series), and range in thickness from about 25 to 80 mils. The standard exclusion seal, depending on customer requirements, is provided as described or placed in a nonmagnetic housing, such as of aluminum or stainless steel (for example, 300 series), such as by bonding- or staking-assembly techniques.

The exclusion seal is formed by placing a precise, optimum amount of a ferrofluid in the annular gap regions between the inner diameter of the pole pieces and the spindle shaft. Typically, the ferrofluid comprises a low-vapor-pressure carrier liquid, such as fluorocarbon, a polyphenylether, a hydrocarbon, a diester liquid and similar low-vapor-pressure liquids, to provide for a very low mass loss of the ferrofluid forming the O-ring seal, thereby providing an exclusion seal of long operating life. For example, the standard ferrofluid exclusion seal is expected generally to last for several years under moderate temperature conditions and with the currently used computer-disc-drive-spindle speeds of 3600 rpm and with shaft diameters up to about 1.8 inches. The ferrofluid used may vary in viscosity, and the saturation magnetization, which usually ranges from 20 to 500 cps, and 100 to 400 gauss respectively. Zp It is desirable to extend the useful operating life of ferrofluid exclusion seals, particularly under higher ambient-temperature conditions; for example, greater than 50° C., at spindle speeds that exceed 3600 rpm, and for larger shaft diameters, or a combination of these conditions.

SUMMARY OF THE INVENTION

The invention relates to a ferrofluid-type, rotary-shaft seal having an extended life and to the method of manufacturing and using such seal apparatus. In particular, the invention concerns a ferrofluid exclusion seal particularly useful with and in sealing computer-disc-drive spindles for extended time periods.

In a standard ferrofluid exclusion seal, it has been found that there are two basic design considerations—one magnetic, which determines the seal pressure, and the other heat-generation, which determines the seal life span.

Generally, the total pressure capacity of the current ferrofluid exclusion seals ranges from about 30 to 60 inches of water divided approximately equally between the two pole pieces. The pressure requirement for the usual disc-drive application is only 5 inches of water; thus, the seals have a large safety margin when it comes to pressure. In fact, even one ferrofluid O-ring seal is more than adequate to yield the required pressure capacity; however, in the present, standard design, there are two pole pieces, so that the magnetic-flux circuit will be complete.

It is known that a temperature gradient across the ferrofluid O-ring seal is produced, as a result of the heat generated by the viscous shearing of the ferrofluid between the rotating spindle shaft and the inner diameter of the stationary pole pieces. Some of this heat is conducted away through the pole pieces and the spindle shaft. Thus, the operating ferrofluid temperature depends on the heat-sink capabilities of the seal materials and structure, which, in turn, determines the ferrofluid evaporation rate and, therefore, the life of the seal. The operating fluid temperature is higher, when ferrofluid fills both gap regions, than when only one stage is activated with ferrofluid, and the other stage has an air gap under it. This results because each gap region filled with ferrofluid serves as an indpendent source of heat, thus raising the temperature of the seal structure to a higher value than if just one stage had been activated with ferrofluid.

Hence, unlike the seal pressure which doubles for both stages activated, as opposed to just one, seal life increases by having only one gap region filled with ferrofluid, and not both or a plurality of gap regions. Thus, an ideal situation would be one in which only one pole piece is activated with ferrofluid. A second pole piece, which would operate with an air gap, is used only to complete the magnetic circuit. The air gap aids in permitting the movement of air from the cavity between the pole pieces. The present seal-installation techniques, however, prohibit achieving this goal, since the ferrofluid is injected into the magnet area, which results in ferrofluid migration into both gap regions, upon the spindle shaft insertion.

It has been found that ferrofluid seal life may be extended, by increasing the radial gap area from the usual 4 to 6 mils to 12 to 24 mils, or more. It is believed that the increase in seal life, with larger-than-normal gap areas, is based on the lower viscous power loss in the ferrofluid, in accordance with Petroff's equation, so that less heat is developed with a lower ferrofluid operating temperature, with a resulting slower ferrofluid evaporation rate and a longer seal life. The maximum gap area would be that distance wherein the pressure seal is lost, due to lack of magnetic forces. Experiments employing the same ferrofluid have demonstrated that, for gaps of 24 mils (about four times the normal 6-mil gap) in a standard exclusion seal, the ferrofluid temperature decreases 5° C., using a spindle shaft of 1.8 inches in diameter, operating at 3600 rpm, increasing seal life as much as 50%. No ferrofluid splash during operation was observed, even when the ferrofluid had a magnetic saturation level of as low as 100 gauss.

The invention comprises a ferrofluid-type, rotary-seal apparatus having an extended life, wherein one or more of the pole pieces are unequal in length, to form gaps of different gap width, with ferrofluid in each gap area. In a two-pole-piece ferrofluid seal, in its simplest embodiment, one pole piece would have a normal or standard gap width of 2 to 6 mils, while the other or opposite pole piece would have an extended and larger gap width; for example, 10 to 30 mils; for example, about 12 to 24 mils.

On the insertion of the shaft element and the formation of the ferrofluid O-ring seals at each gap to form the exclusion seal, the seal, on rotation of the shaft element, preferentially causes more rapid heat rise and faster evaporation of the ferrofluid at the smaller gap. On failure of the ferrofluid O-ring seal at the small gap, the evaporated ferrofluid gap would become an air gap, while the other larger ferrofluid gap would continue to provide the required pressure-seal function, particularly for a computer-disc-drive spindle. The increase in the ferrofluid gap width, which performs the pressure-sealing function, permits extended life for the seal over the same seal apparatus, where the pole pieces would be equal in length and have the same normal 2-to-6-mil gap width.

In a multiple-stage ferrofluid seal, a plurality of the pole-piece-element lengths may vary as desired from a small gap to a gap of maximum gap width to just a sufficient gap width, to ensure a sealing function with the ferrofluid, so that there would be a continuous, progressive failure of the ferrofluid by evaporation from the smallest-to-the-largest-gap width, which, while progressively lowering the seal-pressure properties of the seal, would provide extended seal life, where requirements for seal pressure are modest, while seal life is more important, as in computer-disc-drive-spindle operations.

The exclusion seal of the invention is enhanced further in seal-life extension, when a heat-conductive, nonmagnetic material, such as stainless steel, copper or aluminum, in accordance with the disclosure of copending U.S. patent application Ser. No. 208,289 filed on the same day as this application and hereby incorporated by reference, is employed in contact and along the pole pieces with the larger gap, to conduct heat away from the ferrofluid at the large-gap width, thereby lowering the ferrofluid temperature and decreasing the rate of evporation and, thus, extending seal life.

The invention will be described for the purpose of illustration only in connection with a particularly preferred embodiment; however, it is recognized that those persons skilled in the art may make various changes and modifications to the described embodiment, without departing from the spirit and scope of the invention.

DESCRIPTION OF THE EMBODIMENTS

Figure 1:
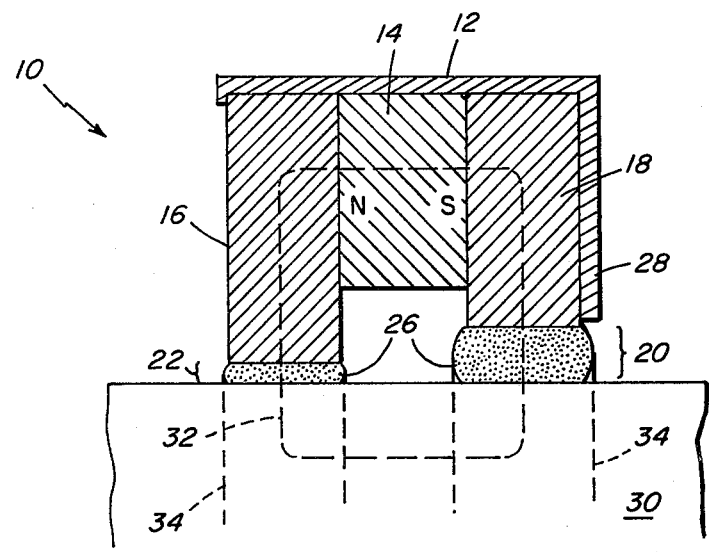
FIG. 1 is a schematic, illustrative, cross-sectional view of a ferrofluid exclusion seal of the invention at the start of operation.

FIG. 1 shows the extended-life, exclusion-seal apparatus 10 which comprises a nonmagnetic housing 12 containing a permanent-magnet ring 14, having opposite poles N and S and magnetically permeable pole pieces 16 and 18 sandwiched on either side of the magnet 14 and in a magnetic-flux relationship therewith. The pole pieces 16 and 18 are of unequal length, with the end of pole piece 16 forming a gap 22 with the surface of a magnetically permeable, rotary shaft 30 of about 2 to 6 mils, while pole piece 18 forms a larger gap 20 with the surface of shaft 30 of 12 to 24 mils. A ferrofluid 26, such as a diester-type ferrofluid, is magnetically retained and captured in the gap 22, to form an O-ring ferrofluid seal 34, while the ferrofluid 26 forms an O-ring ferrofluid seal 34 in the larger gap 20. The closed-circuit, magnetic-flux path 32 is schematically illustrated by the dotted lines, while the two O-rings 34 formed by ferrofluid 26 are shown as parallel dotted lines under each gap 20 and 22. Optionally, the seal also contains a sheet 28 of a nonmagnetic, heat-conductive material in a close, contacting, heat-exchange relationship along the outside of the pole piece 18, with the end of the sheet material extending almost to the end of the pole piece 18 which forms gap 20. Preferably, as illustrated, the sheet material 28 is an integral part of, or contacts, the metal housing 12, to form a greater heat-sink for the conduction of heat from the ferrofluid 26 at gap 20.

The seal apparatus 10 may have pole pieces of equal width, such as 30 to 50 mils in thickness, while the housing 12 and the heat-conductive material 28; for example, 5 to 30 mils, may be formed integrally or separately and be composed of a metal, such as aluminum, copper or nonmagnetic stainless steel. The shaft 30 may be a computer-disc-drive shaft, for example, of 1.8 inches in diameter and operating at 3600 rpm.

In operation, on rotation of the shaft 30, the ferrofluid 26 in gap 22 is evaporated preferentially over the ferrofluid seal of larger gap 20, which, because of its lower ferrofluid temperature, due to both the large-gap width and the conduction of heat away from the gap by sheet material 28, evaporates at a much lower rate.

Figure 2:
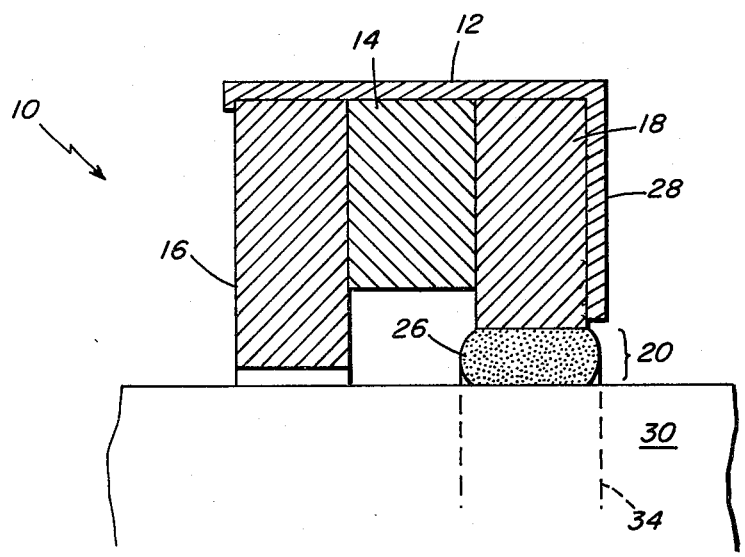
FIG. 2 is the exclusion seal of FIG. 1 after evaporation of the ferrofluid under one pole piece.

FIG. 2 shows the exclusion seal of FIG. 1, wherein the ferrofluid 26 of gap 22 is now an air-gap, due to evaporation, while the ferrofluid of gap 20 provides an O-ring seal for an extended seal life, with increases in seal life of 25% to 50%.

What is claimed is:

1. A ferrofluid, rotary-seal apparatus having an extended seal life, which seal apparatus comprises:
  (a) an annular permanent magnet adapted to surround the rotary shaft to be sealed and having poles of opposite polarity at each end; and
  (b) first and second, magnetically permeable, pole-piece elements in a magnetic-flux relationship with the one and the other ends, respectively, of the permanent magnet, each pole piece having a one end and another end and adapted to surround the rotary shaft to be sealed, the one end of each pole-piece element adapted to extend into a close, non-contacting relationship with the surface of the shaft to be sealed, to form a gap therebetween, the pole-piece elements unequal in length at the one end, to form a first gap which is smaller in length than the length of the second gap, whereby ferrofluid disposed and retained in the first and second gaps, to form magnetic O-ring seals about the shaft, will evaporate preferentially, during rotation of the shaft, from the first gap, to provide a seal apparatus of extended seal life, having a first air gap and a second ferrofluid-sealing gap.

2. The seal apparatus of claim 1 wherein the length of the first pole piece provides for a first gap of from about 2 to 6 mils.

3. The seal apparatus of claim 1 wherein the length of the second pole piece provides for a second gap of from about 12 to 24 mils.

4. The seal apparatus of claim 1 which includes a nonmagnetic, heat-conductive material in a heat-conductive relationship with the second pole piece, to reduce the temperature of the ferrofluid at the second gap.

5. The seal apparatus of claim 4 wherein the heat-conductive material is a sheet material in a contacting relationship with the outer wall of the second pole piece, and having a one end extending into a close relationship with the one end of the second pole piece.

6. In combination a seal apparatus of claim 1 and a rotary-shaft element, the seal apparatus having ferrofluid in at least one gap to seal the rotary shaft.

7. The combination of claim 6 wherein the shaft element comprises a computer-disc-drive-spindle shaft.

8. A ferrofluid, rotary-seal apparatus having an extended seal life, which seal apparatus comprises:
  (a) an annular permanent magnet adapted to surround the rotary shaft to be sealed and having poles of opposite polarity at each end;
  (b) first and second, magnetically permeable, pole-piece elements in a magnetic-flux relationship with the one and the other ends, respectively, of the permanent magnet, each pole piece having a one end and another end and adapted to surround the rotary shaft to be sealed, the one end of each pole-piece element adapted to extend into a close, noncontacting relationship with the surface of the shaft to be sealed, to form a gap therebetween, the pole-piece elements unequal in length at the one end, the length of the first pole piece providing for a first gap of from about 2 to 6 mils, and the length of the second pole piece providing for a second gap of from about 12 to 24 mils, to form a first gap which is smaller in length than the length of the second gap; and
  (c) a nonmagnetic, heat-conductive material in a heat-conductive relationship with the second pole piece, to reduce the temperature of the ferrofluid at the second gap,
  whereby ferrofluid disposed and retained in the first and second gaps, to form magnetic O-ring seals about the shaft, will evaporate preferentially, during rotation of the shaft, from the first gap, to provide a seal apparatus of extended seal life, having a first air gap and a second ferrofluid-sealing gap.

9. In a method for extending the seal life of a ferrofluid, rotary-shaft seal apparatus, which, in sealing a rotary shaft, comprises:
  (a) surrounding the rotary shaft with an annular permanent magnetic having one end and another end and having poles of opposite polarity at each end;
  (b) surrounding the rotary shaft with first and second, magnetically permeable, pole-piece elements in a magnetic-flux relationship with one and the other ends of the permanent magnet, each pole piece having a one end and another end;
  (c) extending the one end of each pole piece into a close, noncontacting relationship with the surface of the rotary shaft, to form first and second gaps therebetween of defined length; and
  (d) retaining magnetically, in the first and second gaps, a ferrofluid to form at least two liquid O-ring seals on the surface of the rotary shaft, to effect sealing of the rotary shaft, the improvement which comprises
  preferentially evaporating ferrofluid from one of the gap lengths by changing the defined gap lengths, to provide for unequal first and second gap lengths, whereby the ferrofluid will evaporate preferentially from the smallest gap length, while the ferrofluid in the largest gap length will provide a seal of extended seal life, in comparison to a seal wherein the gap lengths are smaller and equal.

10. The method of claim 9 which includes providing for a plurality of gap lengths in a multiple-stage seal, the gap lengths of varying gap lengths.

11. The method of claim 9 which includes conducting heat away from the ferrofluid at the large-gap length, to lower the rate of evaporation of the ferrofluid at the large-gap length and further extend the seal life.

12. The method of claim 11 wherein heat is conducted by employing a nonmagnetic, heat-conductive material in contact with the pole piece forming the large-gap length.

13. The method of claim 9 wherein the ferrofluid has a viscosity of from about 50 cps to 500 cps and a magnetic saturation of about 100 to 450 gauss.

14. The method of claim 9 which includes employing as the rotary shaft a computer-disc-drive-spindle shaft.

15. The method of claim 9 wherein the largest gap length ranges from about 12 to 24 mils.

16. The seal apparatus of claim 1 wherein the pole pieces are of equal width.

17. The seal apparatus of claim 16 wherein the pole pieces are from 30 to 50 mils. in thickness.

* * * * *